(12) United States Patent
Rasmussen et al.

(10) Patent No.: US 7,073,460 B1
(45) Date of Patent: Jul. 11, 2006

(54) MOBILE FEEDER

(76) Inventors: Leif Rasmussen, N35299 Weverstad Rd., Blair, WI (US) 54616-8826; Ty Morse, W. 15109 County Rd. H, Melrose, WI (US) 54642

(*) Notice: Subject to any disclaimer, the term of this patent is extended or adjusted under 35 U.S.C. 154(b) by 0 days.

(21) Appl. No.: 10/933,993

(22) Filed: Sep. 2, 2004

Related U.S. Application Data

(60) Provisional application No. 60/548,772, filed on Feb. 27, 2004.

(51) Int. Cl.
*A01K 1/00* (2006.01)

(52) U.S. Cl. .......................................... 119/60
(58) Field of Classification Search ............ 119/58–60
See application file for complete search history.

(56) References Cited

U.S. PATENT DOCUMENTS

| | | | | |
|---|---|---|---|---|
| 3,749,063 A | * | 7/1973 | Buffum | 119/61.56 |
| 4,067,298 A | | 1/1978 | Jones et al. | |
| 4,160,358 A | | 7/1979 | van der Lely | |
| 4,258,663 A | | 3/1981 | Schoessow | |
| 5,000,122 A | | 3/1991 | Smith | |
| 5,076,752 A | * | 12/1991 | Rader | 414/470 |
| 5,158,040 A | * | 10/1992 | Martin | 119/58 |
| 5,178,096 A | * | 1/1993 | Lock | 119/58 |
| 5,311,840 A | * | 5/1994 | Rumbaugh | 119/60 |
| 5,345,895 A | | 9/1994 | Stevens et al. | |
| 5,361,724 A | | 11/1994 | Kuhns | |
| 5,386,800 A | | 2/1995 | Pirok | |
| 5,477,811 A | | 12/1995 | Nobles et al. | |
| 5,496,145 A | * | 3/1996 | Monin | 414/24.5 |
| 5,586,519 A | | 12/1996 | Wilkinson | |
| 5,743,211 A | | 4/1998 | Schoessow | |
| 5,784,997 A | | 7/1998 | Perez | |
| 6,213,053 B1 | * | 4/2001 | Lammers | 119/51.01 |
| 6,691,642 B1 | * | 2/2004 | Dollahan | 119/58 |
| 2002/0179016 A1 | | 12/2002 | Plymell | |

* cited by examiner

*Primary Examiner*—Thomas Price
(74) *Attorney, Agent, or Firm*—Albert W Watkins

(57) ABSTRACT

A mobile feeder uses a wagon wheel set with a draw bar. The wheel set serves as the undercarriage for the feeder. The feeder has a plurality of arcuate supports that are spaced sufficiently to allow livestock to feed between. The arcuate supports are resiliently hung from a frame that defines the outer dimensions of the feeder and pass under a central, longitudinally extending frame bar. When impacted from an animal feeding transverse to the feeder, the arcuate supports flex resiliently, while still retaining proper spacing for both feed and animal. Resilient attachments couple the arcuate supports to frame, and links couple adjacent arcuate supports and thereby distribute forces and help to maintain spacing. Feed trays are provided beneath the arcuate supports to catch and retain any feed inadvertently escaping from the arcuate supports. The feed trays are most preferably sloped from the longitudinal center down and away from the longitudinal center, to provide gravity assist in delivering the errant feed to feeding animals.

22 Claims, 3 Drawing Sheets

MOBILE FEEDER

CROSS REFERENCE TO RELATED APPLICATIONS

This application claims priority to U.S. provisional patent application Ser. No. 60/548,772, filed Feb. 27, 2004, of common title and inventorship, the entire contents which are incorporated herein by reference.

BACKGROUND OF THE INVENTION

1. Field of the Invention

This invention pertains generally to animal husbandry, and more particularly to feeding racks. In a more specific manifestation, the invention pertains to a mobile rack optimally configured for feeding large and powerful animals such as bison and the like.

2. Description of the Related Art

Animal husbandry is a very old technology, certainly prior to any general written histories. Throughout the ages mankind has derived much benefit from animals, ranging from companionship and security from the trusted dog to sources of food and materials when in need. While pre-historic man is thought to have been a hunter and gatherer, reliance upon random events of nature has not been accepted by mankind. Instead, man has developed ways to keep and care for animals which provides synergistic benefit to both man and animal. This is referred to as animal husbandry, which is simply caring for the needs of animals.

While the field of animal husbandry is very broad, and pertains to many diverse species of animals, the present invention is much more directed to the care, and more particularly to the feeding, of very large and powerful animals. In the United States, prior to the European settlers, there were vast herds of bison that roamed the central plains. These animals are ideally adapted to the diverse and sometimes extreme climate, and are able to forage from grasses and other plants that grow naturally. However, these animals are very large and powerful, and have needs and requirements that are somewhat different from cattle. With the influx of Europeans, the bison was almost entirely replaced by cattle, many species which were imported from Europe. The techniques for caring for cattle were well understood by the Europeans, and the cattle were often thought to be more refined and bred.

Relatively recently, there has been a renewed interest in bison. People have learned that the natural processes which led to the selection of bison in the central United States were as a direct result of the suitability of the species for the environment. Furthermore, research of late has revealed that the products of bison, such as the meat, provide generally unexpected benefit to the health and well being of mankind. Furthermore, there is a large and growing consumer base which considers bison meat to be preferable to the meat derived from cattle.

With this renewed interest has come a desire to provide better care for these animals. However, these creatures are much different from most species of cattle. Bison have very powerful front shoulders, and are commonly larger and more powerful than cattle. Consequently, equipment as basic as feeders that are used for cattle may not be suitable for use with bison. In fact, ordinary cattle feeders are all too frequently damaged or destroyed when used with bison.

Exemplary of the prior art feeders is Monin, who in U.S. Pat. No. 5,496,145 incorporated herein by reference for the teachings of feeders, illustrates a feeder having a generally cylindrical support configuration. This shape permits bales of any geometry to be loaded into the feeder from above. The bales will then drop, under the force of gravity, to the cylindrical supports below, where they are accessible by hungry animals. This arrangement provides relatively simple and only minimal handling by a ranch hand, while preserving the feed. Without some type of holder, the bales will directly contact the ground, where it is well known that they will spoil at an undesirably high rate. Unfortunately, with rigid supports the powerful bison are liable to destroy the feeder. While it may seem intuitive to simply strengthen the feeder itself, such as by manufacture from relatively heavier materials, this in turn leads to undesirable harm to the bison. Something has to give, whether it is the feeder or the bison.

Another U.S. Pat. No. 5,586,519 to Wilkinson incorporated herein by reference, illustrates an outer frame and flexible chains forming curved supports. This design provides greater flexibility and permits an animal to access the feeder without harm to either animal or feeder. However, the chains are less than optimal in the available movement. Motion within the feeder, such as an accidental bump from loading equipment, while the bales are being loaded or even during feeding, may result in the chains moving unevenly and may in turn result in the feed passing between the chains and from the feeder. Additional documents exemplary of the art and incorporated herein by reference include U.S. Pat. No. 5,076,752 by Rader and U.S. Pat. No. 4,067,298 by Jones et al.

SUMMARY OF THE INVENTION

In a first manifestation, the invention is a mobile feeder. Within the mobile feeder, a mobile base has a longitudinal axis and a plurality of wheels displaced relative thereto and including both front and rear wheels. A base framework extends between the plurality of wheels. A longitudinally directed frame member extends from front wheels to rear wheels and maintains proper orientation therebetween. A tongue is additionally provided that is suitable for enabling a connection to various tow vehicles. The mobile feeder additionally has a feeder supported upon the mobile base that has an upper framing which circumscribes an open top, a feeder base, and side framing members extending between upper framing and feeder base. Attachment members couple feeder to mobile base. A low and generally central longitudinally directed framing member extends longitudinally between attachment members. A plurality of straps extend generally from adjacent upper framing down therefrom and underneath the low and generally central longitudinally directed framing member in an arcuate fashion. Resilient attachments couple the straps to upper framing, and links couple and space the straps to adjacent straps.

In a second manifestation, the invention is an animal feeder having a framework; at least two arcuately shaped straps repeating along a first general axis and being more flexible transverse to the first axis than parallel thereto; attachments suspending the straps from the framework and permitting relative movement therebetween; and a base which supports the framework.

In a third manifestation, the invention is, in combination, a mobile base and a feeder defining a mobile feeder. The mobile base has a longitudinal axis, a plurality of wheels displaced relative to the longitudinal axis and includes a pair of front wheels and a pair of rear wheels, at least one base framework extending between the plurality of wheels, and a longitudinally directed frame member which extends between front and rear wheels and maintains proper orientation therebetween. A tongue suitable for enabling a connection to various tow vehicles is coupled to the pair of front wheels to re-orient them when the tongue is moved relative to the longitudinally directed frame member. The feeder is supported upon the mobile base, and has an upper framing which circumscribes an open top; a feeder base; side framing members extending between upper framing and feeder base; attachment members coupling feeder base to mobile base; a plurality of straps extending from a first terminus adjacent to the upper framing to a second terminus adjacent the upper framing member in an arcuate fashion; resilient attachments coupling the plurality of straps to upper framing; and links coupling and spacing the plurality of straps.

OBJECTS OF THE INVENTION

Exemplary embodiments of the present invention solve inadequacies of the prior art by providing a feeder having easily filled arcuate supports and resilient mounts attaching the supports to the frame. Trays may be provided which are supported upon the frame and which collect any feed that may escape beneath the supports.

A first object of the invention is to provide a durable feeder which will not harm large animals. A second object of the invention is to optimally preserve feed. Another object of the present invention is to ensure that the feeder is readily loaded with one or a plurality of bales of feed, while requiring minimal skill or caution during loading. A further object of the invention is to enable the feeder to be transported across both short and long distances, whether empty or full, and, if so desired, be separated from the mobile transport base. Yet another object of the present invention is to provide the foregoing objects using ready manufacturing materials and techniques. An additional object of the invention is to couple the components to permit replacement in the field, and to reduce the number of unique components, thereby simplifying repair where necessary.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
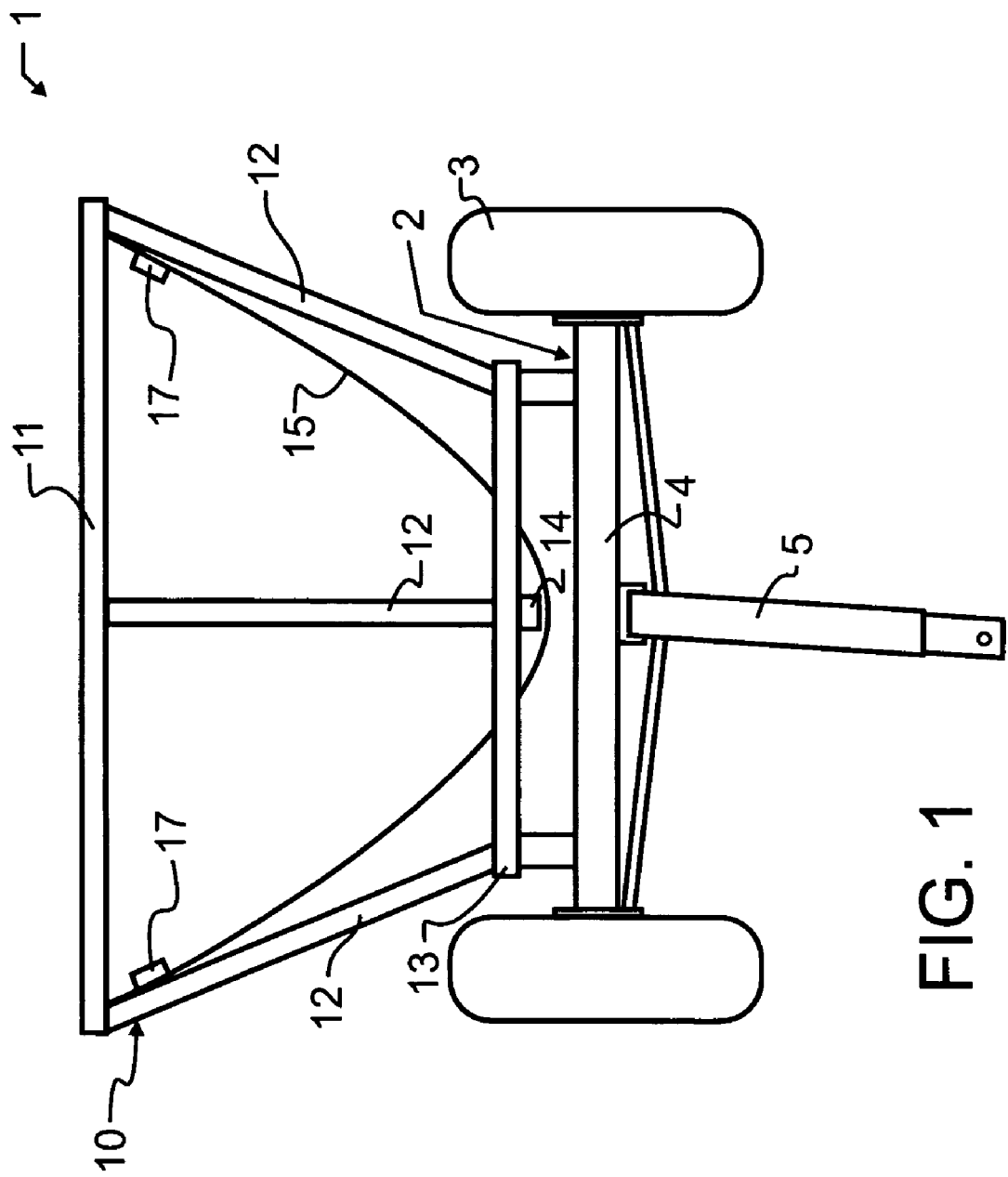
FIG. 1 illustrates a preferred embodiment mobile feeder designed in accord with the teachings of the present invention from a front plan view.
Figure 2:
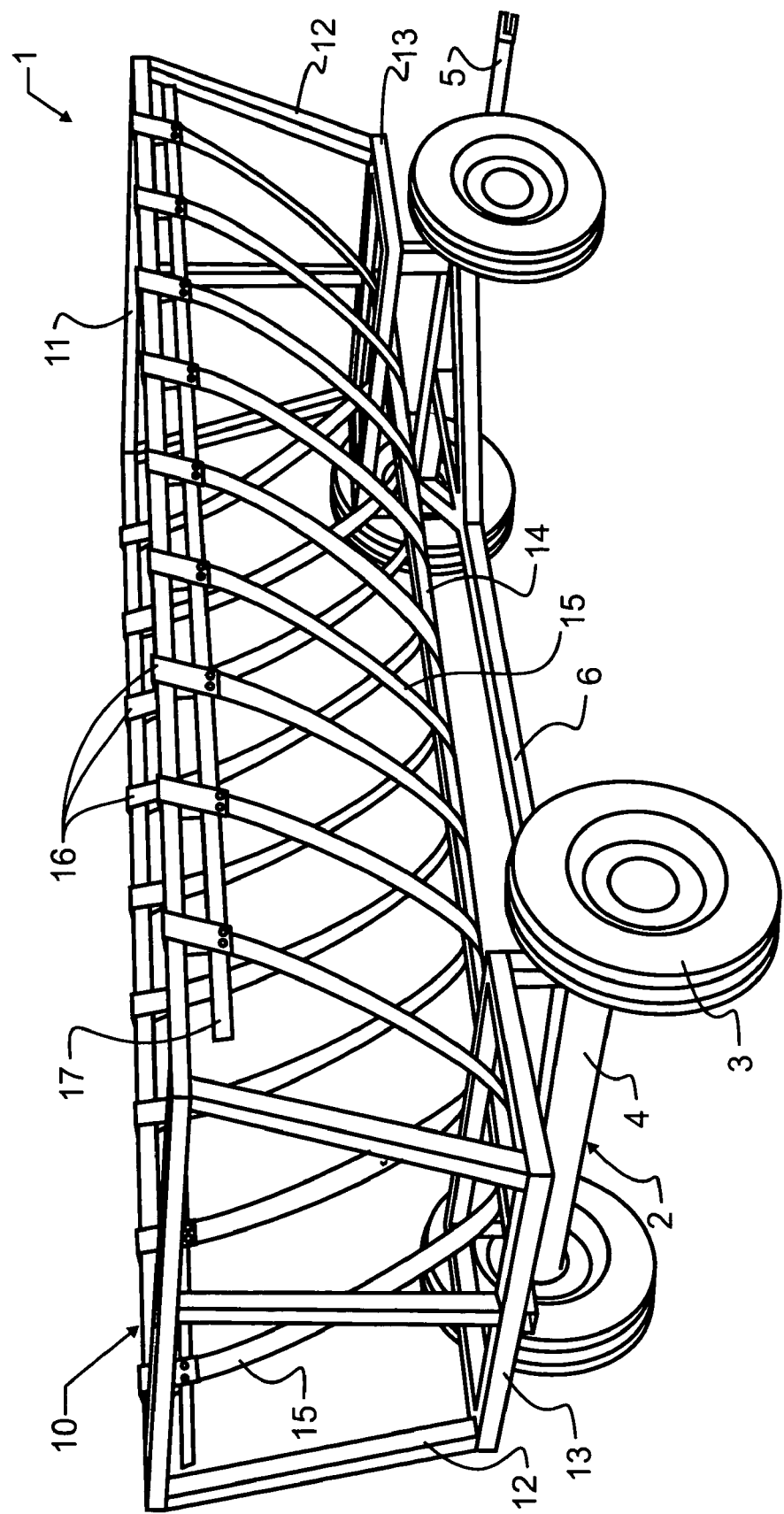
FIG. 2 illustrates the preferred embodiment mobile feeder of FIG. 1 from a rear projected view.

In a most preferred embodiment designed in accord with the teachings of the invention and illustrated in FIGS. 1–2, a mobile feeder 1 includes a mobile base 2 and a feeder 10 supported thereon. In this preferred embodiment, mobile base 2 may be a wheel set of the type typically used as the base for traditional hay wagons or the like found on many farms, though any suitable mobile base may be used in association with the present invention. Such a mobile base 2 will typically include a plurality of wheels 3, four in the preferred embodiment, and at least one base framework 4 which may, as illustrated, extend between wheels 3. While not essential to the workings of the invention, it will be understood that most such wagons will typically have a longitudinally directed frame member, such as member 6 visible in FIG. 2, which extends from the front wheel set to the back and maintains the two in proper orientation. A tongue 5 enables connection of mobile base 2 to various tow vehicles, as will be described herein below. This tongue 5 may further be coupled to the front wheel set to permit the re-orientation of front wheels 3 when tongue 5 is moved relative to member 6. In such case, a certain amount of steering is intrinsically provided within the front wheel set, to better enable mobile feeder 1 to track behind a towing vehicle.

Feeder 10 includes an upper framing 11 which circumscribes an open top. Side framing members 12 are provided about feeder 10. In the preferred embodiment mobile feeder 1, these side framing members 12 are located at each corner, and are also found adjacent longitudinally directed frame member 6 at the front and rear of feeder 10. Attachment members 13 are preferably provided which permit feeder 10 to be firmly attached to mobile base 2. In the preferred embodiment, attachment members 13 are in the form of rectangular frames at the front and rear lowermost portions of feeder 10, which in turn also permits feeder 10 to be independently placed upon the ground and be self-supporting separate from mobile base 2. The particular shape and geometry of attachment members 13 are not believed to be critical to the operation of the present invention, and so they may take on any shape or geometry that fulfills the intended functions of attachment and support. In the preferred embodiment, attachment members 13 include posts that slip into standard pockets found on many prior art wagon frames.

Extending longitudinally between attachment members 13 is a low and generally central longitudinally directed framing member 14. As may be recognized, the use of square or round tubing, or even members of other geometry such as I-beams or any other suitable framing will be understood to be included herein for consideration of fabrication of the various members which comprise mobile feeder 1, including framing member 14.

Extending generally from adjacent upper framing 11 down therefrom and most preferably underneath framing member 14 in an arcuate fashion are a number of straps 15. Straps 15 are most preferably semi-rigid, and will maintain their arcuate shape under the load that would be induced by feed. These straps 15 are most preferably held onto upper framing 11 by a plurality of flexible and resilient attachments 16. In the preferred embodiment, these attachments 16 may be of a reasonably tough and durable elastomer such as a rubber compound or the like, and may for exemplary purposes be filled with various compounds and ingredients including carbon black, various cross-linking and vulcanizing agents, plasticizers, and other compounds which may be deemed to be suitable for the present application. Other elastomeric or resilient materials or attachments, the materials, geometries and compositions which will be recognized as being of infinite variation and so too many to attempt to list individually herein, may be utilized to form the present coupling. However, regardless of specific material or geometry utilized, these attachments 16 should provided a significant amount of resilience and strength to protect both animal and feeder.

Linking and spacing the various straps 15 is a link 17. In this first preferred embodiment, this link 17 may be relatively rigid and may, for exemplary purposes only and not limited thereto, comprise a steel strap or the like. However, as will be apparent, other materials may be used for link 17, even those which are flaccid, provided adequate design considerations are made. The attachment between straps 15, resilient attachments 16, and links 17 is most visible in FIGS. 2 and 3, which illustrates the flexible support loops comprising resilient attachments 16 and bar comprising link 17 utilized in the preferred embodiment of FIG. 1 from a projected view. As may be identified therein, fasteners may be provided which couple each of the components together. While bolts and nuts or rivets may be used, any of the myriad of equivalents may also be used, and the particular fastener selected is not consequential to the operation of the invention. Consequently, the particular means or device used for fastening will be chosen by a designer reasonably skilled in the art, with consideration of the present disclosure. Nevertheless, it is preferred to use fasteners throughout the preferred embodiment mobile feeder 1 that are removeable using basic tools, which permits any components that become damaged during use to readily be removed and replaced. In mobile feeder 1, bolts and nuts have been used to attach many of the feeder 10 framing components to each other, so that, for exemplary purposes, if a longitudinally extending upper framing member 11 becomes bent, this framing member may be unbolted from the remaining framing members and replaced, without requiring destructive cutting or the like.

By coupling straps 15 and resilient attachments 16 together, any forces that may be applied on one strap 15 will not only be coupled through a single adjacent resilient attachment 16 but will most preferably also be coupled through several nearby resilient attachments 16 through the action of link 17. Link 17 additionally provides a relatively consistent spacing between straps 15, even during or after significant or forceful use. Most preferably, this spacing will be at least at an average as wide as would minimally be required for one or more species of animals for which the present invention is adapted for to reasonably feed therefrom. In the preferred embodiment, the spacing is sufficiently large to permit bison or buffalo to feed therefrom. The straps 15 should also be sufficiently close together to avoid substantial quantities of hay or other feed for which the present invention may be designed from passing between adjacent straps before, during or after such feeding.

As is known, steel straps such as are used in the preferred embodiment feeder 10 have a rectangular cross-section which causes them to be substantially more rigid and resistant to bending movement parallel to the longitudinal axis of the rectangular cross-section than orthogonal thereto. In the present application, this means that straps 15 are generally more resistant to bending movement that would displace them along the longitudinal axis of mobile base 2 than they are to bending movements that would cause them to move laterally with respect to base 2. The result of this different bending resistance is quite significant in operation. As may be appreciated, the relative stiffness along the longitudinal axis of mobile base 2 further helps to ensure that the desired spacing between straps 15, suitable for animals to feed while not permitting feed to pass through, is maintained. However, when an animal charges forward, or tries to force deeper into feeder 10 to access food, straps 15 will most preferably be sufficiently pliant to absorb such forces without unduly stressing the balance of mobile feeder 1 or harming the animal. In such event, it will be recognized that the affected straps 15 may deform from the ordinary smooth arcuate geometry, and a certain amount of resilience within resilient attachments 16 will permit this flexure without concentrating stress at the terminations of straps 15.

As should be recognized then, straps 15 are preferably designed to be rigid along the longitudinal axis of feeder 10, to maintain relatively even spacing and consequently preserve feed. However, they should be pliant and resilient transverse to the longitudinal axis of feeder 10, to permit limited deformation and shock absorption such as might occur when being impacted by a charging or forceful feeding animal pursuing food. The materials chosen for straps 15 and resilient attachments 16 will be considered in association with the anticipated forces applied by the particular animal for which the feeder is designed, to best select the particular dimensions which will achieve this desired differential flexure. As should now be recognized, while steel straps having a simple rectangular cross-section are used in the preferred embodiment, materials other than steel may be used and shapes other than rectangular may be crafted by those skilled in the art that will still achieve the intended differential flexure. Many different materials and geometries will be contemplated by those skilled in the art in light of the present disclosure, but steel strap is readily available for low cost and is readily utilized in the manufacture of feeder 10.

Preferred embodiment mobile feeder 1 is designed for optimal operation in further combination with animal feed such as hay or the like, though any type of feed may be transported in feeder 10, so long as there is sufficient integrity within the feed to be reasonably retained within straps 15. Most preferably, mobile feeder 1 will support a plurality of standard units of feed, such as a plurality of bails. As may be understood from the pliant operation of resilient attachments 16 and straps 15, when the hay, other feed, animal, transport motion or other effector applies uneven forces, straps 15 may move slightly relative to one another from consistent or even spaces. Consequently, the feed transported therein must not only be able to span the average spacing, but some distance greater.

At first blush, the benefit of the flexible and resilient character of straps 15 and attachments 16 may not be apparent. However, when a bison feeds from feeder 10, the bison may apply very large forces to straps 15 in pursuit of feed 18. These animals are large, and capable of destroying even very heavily built feeders of conventional design. The preferred resilient attachment taught herein permits relatively lighter materials to be used, and at the same time provides better benefit not only in durability but also in animal care, since the structure provides resilience which reduces potential harm to the animals.

The preferred embodiment mobile feeder 1 is most preferably configured for the further combination with both animal feed and a towing vehicle, as will be apparent to those reasonably skilled in the art. An all-terrain vehicle, commonly known of as a four-wheeler or ATV, may be used as the towing vehicle, but it will be understood that other vehicles such as pick-up trucks, tractors, and any of a myriad of other vehicles may be used. An ATV vehicle is described purely for illustrative purposes and is in no way limiting the type of towing vehicle which may be used herein.

The mobility illustrated herein permits mobile feeder 1 to be used in a rotational feeding and grazing program. By moving mobile feeder 1 on a regular basis, the animals will also move about a pasture with the feeder. As is known, manure tends to be concentrated adjacent the feeder, and any grasses or crop will likewise be trampled. However, by periodically moving mobile feeder 1 about the pasture, the manure will be naturally distributed by the animals. Furthermore, any single locale will only have to endure minimal trampling, and will normally readily recover therefrom. With this natural distribution of manure, which helps to keep the soil fertile, and the prevention of destructive trampling, the entire pasture may be easily maintained in optimal condition by this simple movement of mobile feeder 1.

Figure 3:
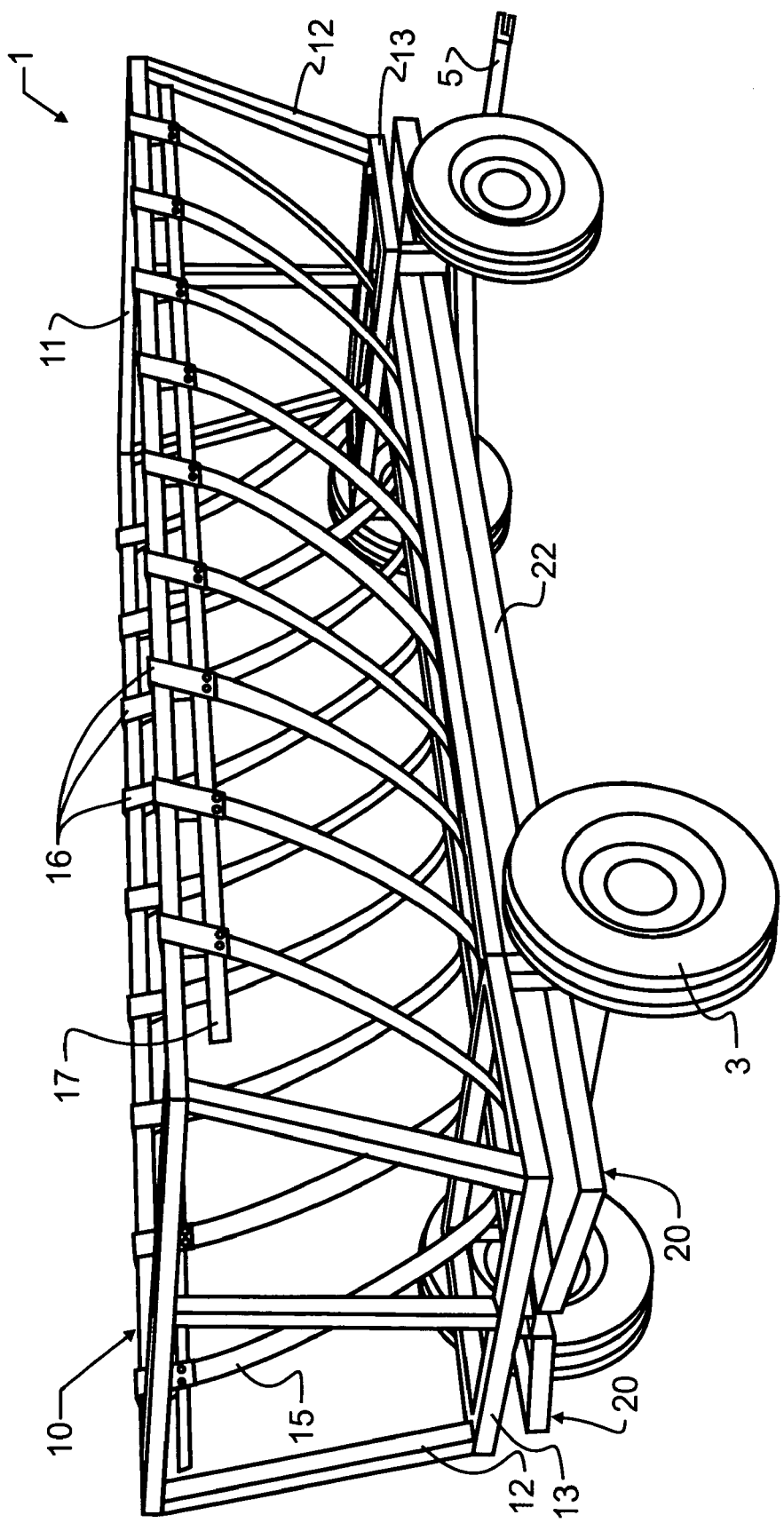
FIG. 3 illustrates the preferred embodiment mobile feeder of FIG. 2 in further combination with a preferred feed tray.

FIG. 3 illustrates the preferred embodiment mobile feeder 1 of FIGS. 1 and 2, and further illustrating feeder 10 in combination with feed trays 20. These feed trays 20 will most preferably rest underneath straps 15 and generally central longitudinally directed framing member 14. In the preferred embodiment illustrated therein, feed trays 20 will slope from a high point adjacent member 14 to a point lower farther therefrom. Such slope will assist in the delivery of any feed which inadvertently falls between straps 15 to feeding animals, without the feed contacting the ground and potentially being ruined. Most preferably, feed trays 20 will include a lip or edge 22 which helps to maintain any stray feed therein. In the illustrated embodiment, feed trays 20 may be attached using U-bolts at suitable anchor points, but any suitable method of attachment may be utilized. One significant benefit of bolts or similar removable fasteners is the ability to remove or replace trays 20 as desired or required. While not separately illustrated, it will be apparent that drain holes may be strategically located within feed trays 20, to prevent an accumulation of liquid therein.

From these figures and foregoing description, several additional features and options may become more apparent. First of all, mobile feeder 1 may be manufactured from a variety of materials, including metals, resins and plastics, ceramics or cementitious materials, rubbers, elastomers, or even combinations of the above. The specific material used may vary, though special benefits are attainable if several important factors are taken into consideration. Firstly, mobile feeder 1 should be sufficiently durable to withstand the impact of any animals which may access feeder 10. Preferably, feeder 10 will readily separate from mobile base 2. Most preferably, mobile feeder 1 will also be weather and sunlight resistant and sufficiently durable to withstand the particular climate for the intended application, including any forces that may be applied that could tend to fracture or shear any of the components therein.

A variety of designs have been contemplated for mobile feeder 1. The basic geometry illustrated herein is most preferred, and makes construction possible using readily available components and without difficult manufacture. However, mobile feeder 1 may also be manufactured to take on any suitable aesthetic appearance or geometry, or to take a form which offers other or additional functional benefit without departing from the spirit of the present invention. Various creature, fantasy or human figures, plants, and even unique thematic displays may be constructed. The materials used for a particular design may be chosen not only based upon the aforementioned factors such as weather resistance and structural soundness, but may also factor in the particular design.

While the foregoing details what is felt to be the preferred and additional alternative embodiments of the invention, no material limitations to the scope of the claimed invention are intended. The variants that would be possible from a reading of the present disclosure are too many in number for individual listings herein, though they are understood to be included in the present invention. Further, features and design alternatives that would be obvious to one of ordinary skill in the art are considered to be incorporated also. The scope of the invention is set forth and particularly described in the claims herein below.

We claim:

1. A mobile feeder, comprising:
   a mobile base having a longitudinal axis and a plurality of wheels displaced relative to said longitudinal axis and including both front and rear wheels, at least one base framework extending between said plurality of wheels, a longitudinally directed frame member which extends between said front wheels to said rear wheels and maintains proper orientation therebetween, and a tongue suitable for enabling a connection of said mobile base to various tow vehicles; and
   a feeder supported upon said mobile base having an upper framing which circumscribes an open top, a feeder base, side framing members extending between said upper framing and said feeder base, attachment members coupling said feeder to said mobile base, a low and generally central longitudinally directed framing member extending longitudinally between said attachment members, a plurality of straps extending generally from adjacent upper framing down therefrom and underneath said low and generally central longitudinally directed framing member in an arcuate fashion, resilient attachments coupling said plurality of straps to said upper framing, and links coupling and spacing said plurality of straps.

2. The mobile feeder of claim 1 wherein said plurality of straps are pliant and resilient transverse to said mobile base longitudinal axis and relatively more rigid parallel to said longitudinal axis of feeder, to permit limited deformation and shock absorption when being impacted by a charging or forceful feeding animal pursuing food and otherwise maintaining relatively even spacing and consequently preserving feed.

3. The mobile feeder of claim 2 wherein said plurality of straps further comprise steel having a rectangular cross-section substantially more rigid and resistant to bending movement parallel to a longitudinal axis of said rectangular cross-section than orthogonal thereto, wherein said plurality of straps are generally more resistant to bending movements along said mobile base longitudinal axis than to bending movements laterally with respect to said base.

4. The mobile feeder of claim 1 wherein said plurality of straps are arcuate without load, and remain arcuate under loads induced by feed.

5. The mobile feeder of claim 1 wherein said plurality of straps are sufficiently pliant to deform from smooth arcuate geometry during operative impacts therewith, and a resilience within said resilient attachments permits said deformation of said plurality of straps while distributing stress within said plurality of straps.

6. The mobile feeder of claim 1 wherein said plurality of straps are operatively spaced to prevent substantial quantities of feed from passing between adjacent ones of said plurality of straps in the absence of animal feeding and while also operatively spaced to permit an animal to feed therebetween.

7. The mobile feeder of claim 1 wherein said resilient attachments further comprise rubber.

8. The mobile feeder of claim 1 wherein said links couple forces applied to ones of said plurality of straps through to adjacent ones of said plurality of straps.

9. The mobile feeder of claim 1 wherein said links comprise a steel strap having a rectangular cross-section.

10. The mobile feeder of claim 9 wherein said links further provide a relatively consistent spacing between adjacent ones of said plurality of straps.

11. The mobile feeder of claim 1 further comprising at least two frames at the lowermost portions of said feeder which support said feeder when directly placed upon the ground.

12. The mobile feeder of claim 1 further comprising feed trays beneath said plurality of straps, wherein said feed trays slope from a high point adjacent said generally central longitudinally directed framing member to a point lower farther therefrom, whereby any feed which inadvertently falls between said plurality of straps may be delivered by gravity towards a feeding animal.

13. The mobile feeder of claim 12 wherein said feed trays further comprise a lip, wherein said lip helps to maintain any stray feed within said feed trays.

14. The mobile feeder of claim 1 further comprising a tongue coupled to said front wheels to permit the re-orientation of said front wheels when tongue is moved relative to said mobile base longitudinally directed frame member, wherein a certain amount of steering is intrinsically provided within the front wheels to better enable said mobile feeder to track behind said various towing vehicles, and said tongue further comprises a hitch for coupling to said various towing vehicles.

15. In combination, a mobile base and a feeder defining a mobile feeder, said mobile base comprising:
   a longitudinal axis and a plurality of wheels displaced relative to said longitudinal axis and including a pair of front wheels and a pair of rear wheels;
   at least one base framework extending between said plurality of wheels;
   a longitudinally directed frame member which extends between said front wheels and said rear wheels and maintains proper orientation therebetween;
   a tongue suitable for enabling a connection of said mobile base to various tow vehicles and further coupled to said pair of front wheels to re-orient said pair of front wheels when said tongue is moved relative to said longitudinally directed frame member;
said feeder supported upon said mobile base and comprising:
   an upper framing which circumscribes an open top;
   a feeder base;
   side framing members extending between said upper framing and said feeder base;
   attachment members coupling said feeder base to said mobile base;
   a plurality of straps extending from a first terminus adjacent to said upper framing to a second terminus adjacent said upper framing member in an arcuate fashion;
   resilient attachments suspending said plurality of straps from said upper framing, and permitting said location of said termini to change relative to said upper framing responsive to an external force applied to said plurality of straps; and
   links coupling and spacing said plurality of straps.

16. The combination mobile base and feeder defining a mobile feeder of claim 15, further comprising feed trays underneath said plurality of straps retaining any feed which inadvertently falls between said plurality of straps and accessible to feeding animals, said feed trays sloping from a high point adjacent a midpoint between said first and second termini to a point lower farther therefrom, whereby any feed which inadvertently falls between said plurality of straps may be delivered by gravity towards a feeding animal.

17. The mobile feeder of claim 1, wherein said plurality of straps are pivotal about said upper framing while securely coupled to said upper framing by said resilient attachments.

18. The mobile feeder of claim 17, wherein said links are spaced from said upper framing by said resilient attachments.

19. The mobile feeder of claim 3, wherein said resilient attachments comprise an elastomer.

20. The mobile feeder of claim 19, wherein said resilient attachments comprise elastomeric straps having a rectangular cross-section substantially more rigid and resistant to bending movement parallel to a longitudinal axis of said rectangular cross-section than orthogonal thereto, said plurality of elastomeric straps generally more resistant to bending movements along said mobile base longitudinal axis than to bending movements laterally with respect to said base.

21. The combination mobile base and feeder defining a mobile feeder of claim 15, wherein said resilient attachments further comprise elastomeric straps separating said first and second termini from said frame.

22. The combination mobile base and feeder defining a mobile feeder of claim 15, further comprising links coupling adjacent ones of said first termini to each other, said links separated from said upper framing by at least said resilient attachments.

* * * * *